United States Patent Office 3,097,242
Patented July 9, 1963

3,097,242
HYDRINDENE SULFONYLUREAS
Hans Hoehn and Hermann Breuer, Regensburg, Germany, assignors to Olin Mathieson Chemical Corporation, New York, N.Y., a corporation of Virginia
No Drawing. Filed June 21, 1961, Ser. No. 127,778
Claims priority, application Germany June 29, 1960
6 Claims. (Cl. 260—553)

This invention relates to hydrindenesulfonylureas (indanesulfonylureas). More particularly the invention relates to hydroaromatic sulfonylureas having the general formula (I)

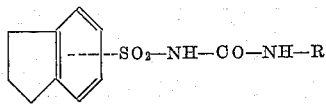
—SO$_2$—NH—CO—NH—R

R in the above formula represents alkyl and alkenyl groups, especially lower alkyl and alkenyl groups such as methyl, ethyl, propyl, isopropyl, butyl, t-butyl, amyl, and allyl and the like, cycloalkyl groups, especially 4 to 6 carbon atom cycloalkyl groups such as cyclobutyl, cyclopentyl, and cyclohexyl, aryl groups such as naphthyl, phenyl and monosubstituted phenyl groups such as halophenyl, e.g. p-chlorophenyl, lower alkoxyphenyl groups such as methoxyphenyl, ethoxyphenyl, lower alkylphenyl groups such as tolyl and the like, and aralkyl groups, especially phenyl-lower alkyl groups such as benzyl, phenethyl and the like, as well as phenyl-lower alkyl groups containing substituted phenyl groups such as those enumerated above.

Salts of the above compounds, particularly alkali metal salts and alkaline earth metal salts are also within the scope of the invention.

Preferred are those compounds of Formula I wherein the sulfonylurea group is attached to the 5-position of the hydro-aromatic ring system and R represents cyclohexyl, butyl or benzyl, especially cyclohexyl.

The compounds of Formula I are produced by converting a hydrindenesulfonamide of the formula (II)

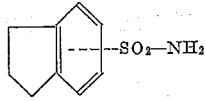
—SO$_2$—NH$_2$ to a salt, preferably an alkali metal salt such as the sodium or potassium salt or an alkaline earth metal salt such as the calcium or barium salt, and reacting the salt with a derivative of isocyanic acid, that is, an isocyanic acid ester of the formula (III)            O=C=N—R wherein R has the meaning already defined or with a carbonic acid derivative.

When a carbonic acid derivative is used, the hydrindenesulfonylureas may be prepared by two alternate routes. According to one method the hydrindenesulfonamide is directly reacted with an N-substituted carbamic acid chloride or with the corresponding urethane derivative. Alternatively a two-step reaction may be used wherein the sulfonamide reacts first with a chloroformic acid ester or phosgene or an unsubstituted urethane or urea and then the primary amino group is introduced.

According to another modification, the hydrindenesulfonamide is converted to the corresponding thiourea compound and then desulphurized or converted to the guanidine analog which is then hydrolyzed.

Still another modification comprises utilizing a hydrindenesulfonyl chloride to react with an isourea alkyl ether, preferably in the form of a metal salt, and then treating the reaction product by acid hydrolysis to obtain the desired compound.

In all cases the reaction conditions vary within relatively broad limits depending generally upon the nature of the substituent being introduced into the hydrindenesulfonamide urea molecule. In general the reaction may be carried out in an inert solvent at room temperature or slightly elevated temperatures.

The hydrindenesulfonyl ureas of this invention have marked blood sugar reducing properties of long duration and are useful as hypoglycemic agents. The compounds of Formula I or pharmaceutically acceptable salts thereof may be administered orally in conventional dosage forms such as tablets, capsules and the like. The following examples are illustrative of the invention. All temperatures are stated in degrees centigrade.

*Example 1*

19.7 g. of hydrindene-5-sulfonamide are dissolved in 50 ml. of 2 N sodium hydroxide solution and 150 ml. of acetone. 16.2 g. of cyclohexyl isocyanate are added dropwise with stirring at 15°. This solution is stirred for an additional two hours, diluted with 5 volumes of water and filtered. The filtrate is acidified with dilute acidic acid. 25.2 g. of 1-cyclohexyl-3-(hydrindene-5-sulfonyl)urea are obtained, recrystallized from 70% acetone and dried in vacuo at 50°, M.P. 153–155°.

*Example 2*

(a) A solution of 19.8 g. of hydrindene-4-sulfonic acid, 20 ml. of thionyl chloride and 1.0 ml. of N,N-dimethylformamide is refluxed for three hours and concentrated in vacuo to remove the excess of thionyl chloride. The residue, consisting of hydrindene-4-sulfonyl chloride, is dissolved in ether and added slowly to 100 ml. of concentrated aqueous ammonia, with external cooling. The solid which forms is filtered and washed with water to give hydrindene-4-sulfonamide.

(b) To 19.7 g. hydrindene-4-sulfonamide, 13.8 g. of anhydrous potassium carbonate, and 200 ml. of dry acetone is added slowly 13.7 g. of ethyl chlorocarbonate. The resulting mixture is stirred and refluxed overnight, cooled and the solid filtered. The solid is dissolved in water and carefully acidified to give ethyl hydrindene-4-sulfonylcarbamate.

(c) To 21.9 g. of n-butylamine, with cooling is added 28.6 g. of ethyl hydrindene-4-sulfonylcarbamate. The solution is slowly heated under reduced pressure so that the excess of n-butylamine distills and the residue remaining is finally heated at 125–135° and 1 mm. of pressure for three hours. On cooling, the residue crystallizes. The solid is dissolved in 500 ml. of 1% aqueous sodium hydroxide, the solution is clarified and the filtrate acidified with dilute hydrochloric acid to give 1-n-butyl-3-(hydrindene-4-sulfonyl)urea.

*Example 3*

The hydrindene-4-sulfonyl chloride, prepared as in Example 2(a) is added slowly to 10.1 g. of n-propylguanidine in 100 ml. of dry acetone. The mixture is stirred and refluxed for three hours and concentrated in vacuo to give a residue of hydrindene-4-sulfonylguanidine hydrochloride. This material is dissolved in 100 ml. of 10% aqueous hydrochloric acid and the mixture evaporated to dryness on the steam bath. The procedure is repeated and the residual solid stirred up with cold water and filtered to give 1-n-propyl-3-(hydrindene-4-sulfonyl)urea.

*Example 4*

A mixture of 19.7 g. of hydrindene-5-sulfonamide, 13.8 g. of anhydrous potassium carbonate and 200 ml. of acetone is cooled while gaseous phosgene is introduced. When 11.0 g. of phosgene has been absorbed, the introduction of the gas is discontinued, and the resulting mixture is stirred and refluxed overnight. The acetone solution is decanted, the insoluble material is washed several times with fresh acetone and the acetone solutions combined. To this acetone solution, containing hydrindene-5-sulfonylcarbonyl chloride is added dropwise, 14.6 g. of n-butylamine, and subsequently, the mixtures stirred and refluxed overnight. The acetone is distilled, the residue is dissolved in water, the solution is filtered and the filtrate acidified to give 1-n-butyl-3-(hydrindene-5-sulfonyl)urea.

*Example 5*

By substituting 14.4 g. of N-ethyl-O-ethyl isourea for the n-propylguanidine in Example 3, there is obtained, by the same procedure, 1-n-ethyl-3-(hydrindene-4-sulfonyl)-urea.

*Example 6*

(a) 8.9 g. of hydrindene-4-sulfonamide and 6.6 g. of 1-n-butyl-2-thiourea are heated gradually up to 170–180° when a brisk evolution of ammonia occurs. The mixture is heated at 170–180° for one hour and the melt cooled to give 1-n-butyl-3-(hydrindene-4-sulfonyl)-2-thiourea.

(b) The product from (a), 500 ml. of 50% ethanol and 16.9 g. of silver nitrate are stirred and refluxed overnight. The mixture is cooled, filtered from the silver sulfide and the filtrate concentrated to dryness. The residue is treated with 500 ml. 2% aqueous sodium hydroxide, refluxed briefly, filtered, and the filtrate cooled and acidified to give the same product as obtained in Example 2(c).

*Example 7*

(a) 8.9 g. of hydrindene-5-sulfonamide and 3.0 g. of urea are heated as in Example 6(a) to give 1-(hydrindene-5-sulfonyl)urea.

(b) The product from (a) and 10.9 g. of methylamine hydrochloride are heated for two hours at 200°. The melt is stirred with water and the solid filtered to give 1-methyl-3-(hydrindene-5-sulfonyl)urea.

*Example 8*

(a) A mixture of 8.9 g. of hydrindene-5-sulfonamide and 10.3 g. of n-propylurethane are heated at 125–130° under 1 mm. of pressure for three hours. The melt solidifies on cooling to give a product identical with the product obtained in Example 7(a).

*Example 9*

17 g. of hydrindene-4-sulfonamide are dissolved in 43.5 ml. of 2 N sodium hydroxide solution and 120 ml. of acetone. A solution of 11 g. of n-butyl isocyanate is added dropwise at 10–15° with stirring over a period of 45 minutes. The mixture is stirred for an additional two hours at room temperature, then diluted with 500 ml. of water and the acetone is distilled off in vacuo. The precipitate is filtered under suction and the filtrate is adjusted to pH 5 with dilute hydrochloric acid. The precipitated 1-butyl-3-(hydrindene-4-sulfonyl)urea is filtered under suction, then purified by dissolving in sodium hydroxide solution and reprecipitating with dilute hydrochloric acid. 17.5 g. of product are obtained which are recrystallized from 80% acetone, M.P. 163–164°.

*Example 10*

By substituting cyclohexyl isocyanate for the n-butyl isocyanate in the procedure of Example 9, 1-cyclohexyl-3-(hydrindene-4-sulfonyl)urea is obtained, M.P. 176–177°.

*Example 11*

40.3 g. of ethyl hydrindene-5-sulfonyl carbamate are warmed at 120° with 25 ml. of water and 9 g. of n-propylamine for 1 hour. The mixture is kept under water vacuum for another 80 minutes at this temperature. The residue is brought into solution by heating gently with 300 ml. of 1% ammonia and 300 ml. of water. The solution is clarified with charcoal and filtered. After cooling, 1-propyl-3-(hydrindene-5-sulfonyl)urea is precipitated with dilute hydrochloric acid. The precipitate is dissolved in dilute sodium hydroxide solution and again precipitated with dilute hydrochloric acid. 29.4 g. of product are obtained which are recrystallized from 70% acetone, M.P. 128–129°.

*Example 12*

By substituting the appropriate amine for the n-propylamine in the procedure of Example 11, the following compounds are obtained:

1-butyl-3-(hydrindene-5-sulfonyl)urea, M.P. 126–127°.
1-isobutyl-3-(hydrindene-5-sulfonyl)urea, M.P. 128–129°.
1-allyl-3-(hydrindene-5-sulfonyl)urea, M.P. 141°.
1-phenethyl-3-(hydrindene-5-sulfonyl)urea, M.P. 129–131°.

What is claimed is:
1. A compound selected from the group consisting of sulfonylureas of the formula

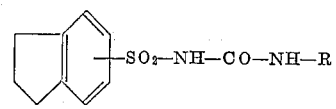

wherein R is a member of the group consisting of lower alkyl, lower alkenyl, cycloalkyl of 4 to 6 carbon atoms, phenyl, substituted phenyl, phenyl-lower alkyl and substituted phenyl-lower alkyl wherein the phenyl substituent in each instance is a member of the group consisting of halo, lower alkoxy and lower alkyl, and alkali metal and alkaline earth metal salts thereof.

2. A compound of the formula

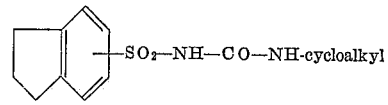

wherein the cycloalkyl group has 4 to 6 carbon atoms.

3. A compound of the formula

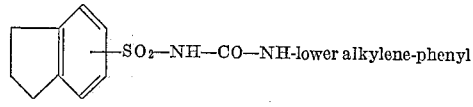

4. A compound of the formula

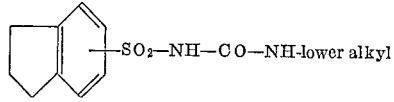

5. 1-cyclohexyl-3-(hydrindene-5-sulfonyl)urea.
6. 1-cyclohexyl-4-(hydrindene-5-sulfonyl)urea.

References Cited in the file of this patent
FOREIGN PATENTS
201,608    Austria _____ Jan. 10, 1959

OTHER REFERENCES
Richter's Organic Chemistry, volume II, pages 1–3 (1938).